United States Patent [19]

Franke

[11] Patent Number: 4,581,635

[45] Date of Patent: Apr. 8, 1986

[54] X-RAY DIAGNOSTIC SYSTEM FOR ANGIOGRAPHIC X-RAY EXAMINATION

[75] Inventor: Kurt Franke, Erlangen, Fed. Rep. of Germany

[73] Assignee: Siemens Aktiengesellschaft, Berlin & Munich, Fed. Rep. of Germany

[21] Appl. No.: 424,433

[22] Filed: Sep. 27, 1982

[30] Foreign Application Priority Data

Dec. 9, 1981 [DE] Fed. Rep. of Germany ....... 3148789

[51] Int. Cl.⁴ .............................................. H04N 5/32
[52] U.S. Cl. ........................................ 358/111; 378/99
[58] Field of Search .......................... 358/911; 378/99; 128/654, 653

[56] References Cited

U.S. PATENT DOCUMENTS

| | | | |
|---|---|---|---|
| 4,204,225 | 5/1980 | Mistretta | 358/111 |
| 4,204,226 | 5/1980 | Mistretta | 358/111 |
| 4,335,307 | 6/1982 | De Vries et al. | 358/111 |
| 4,425,580 | 1/1984 | Haendle et al. | 358/111 |

Primary Examiner—Edward L. Coles, Sr.
Attorney, Agent, or Firm—Hill, Van Santen, Steadman & Simpson

[57] ABSTRACT

An X-ray diagnostic system for angiographic X-ray examinations having an X-ray source for irradiating a patient, a television image intensification chain, and an image subtraction device for producing images which are the result of the difference between images taken at a progression of discrete times during which the concentration of an X-ray contrast medium in blood vessels changes. The subtraction device is provided with two image memories. A control device having a preprogrammable memory controls the times at which image data are stored in the image memories. The preprogrammable memory may be programmed for each time of image storage, or may be programmed only for the times of storage in the first image memory and a time delay factor for storage in the second image memory relative to the times of storage in the first image memory. The time delay factor may be constant or variable.

3 Claims, 2 Drawing Figures

X-RAY DIAGNOSTIC SYSTEM FOR ANGIOGRAPHIC X-RAY EXAMINATION

BACKGROUND OF THE INVENTION

1. Field of the Invention

The present invention relates to X-ray diagnostic systems, and in particular, to such systems for angiographic examinations employing an image intensifier television chain, an image subtraction device connected thereto having two image memories for storing image data taken different times, a device for controlling storage in the image memories, a subtracter for subtracting the memory contents, and a device for displaying the subtraction images.

2. Description of the Prior Art

An X-ray diagnostic system is described in German patent application No. P 31 22 098.3. That system includes a first image memory in which can be stored a single X-ray image, or several integrated X-ray images, obtained prior to subjecting the radiography patient to an injection of an X-ray contrast medium. Such an image is known as a blank image. That system further includes a second image memory in which can be stored a single X-ray image, or several integrated X-ray images, obtained after injecting the patient with the X-ray contrast medium. Such an image is known as a filling image. An image subtraction device subtracts the stored blank image from the stored filling image, thereby producing a difference or subtraction image which shows only the blood vessels important to the diagnosis.

SUMMARY OF THE INVENTION

It is an object of the present invention to provide an X-ray diagnostic system for angiographic examination capable of producing subtraction images and having means for pre-programming and freely selecting the storage of images into the two image memories. The invention advantageously provides for programming the storage of images over the course of a sequence of image takes, resulting in a succession of stored images which reproduces the progression of the X-ray contrast medium through the vessels of interest beginning with a blank image.

According to an important feature of the invention, this object is achieved by providing a control device having a programmable memory for controlling the times of image storage. By so doing, a user may obtain subtraction images from random individual images. The subtraction images may be selected to depict the progression of the contrast medium through the blood vessels thereby optimally adapting subtraction images to the wishes of the user.

According to other important features of the invention, the user may program into the programmable memory each discrete time at which an image is to be stored in either the first or second image memory. Alternatively, the programmable memory enables the user to program only the times for storage in the first image memory and a time delay factor corresponding to the duration between storage and the first and second image memories. The time delay factor may be constant or variable.

Other features and objects of the invention will become apparent from the following detailed description of a preferred embodiment, taken with the accompanying drawings.

DESCRIPTION OF THE PREFERRED EMBODIMENT

Figure 1:
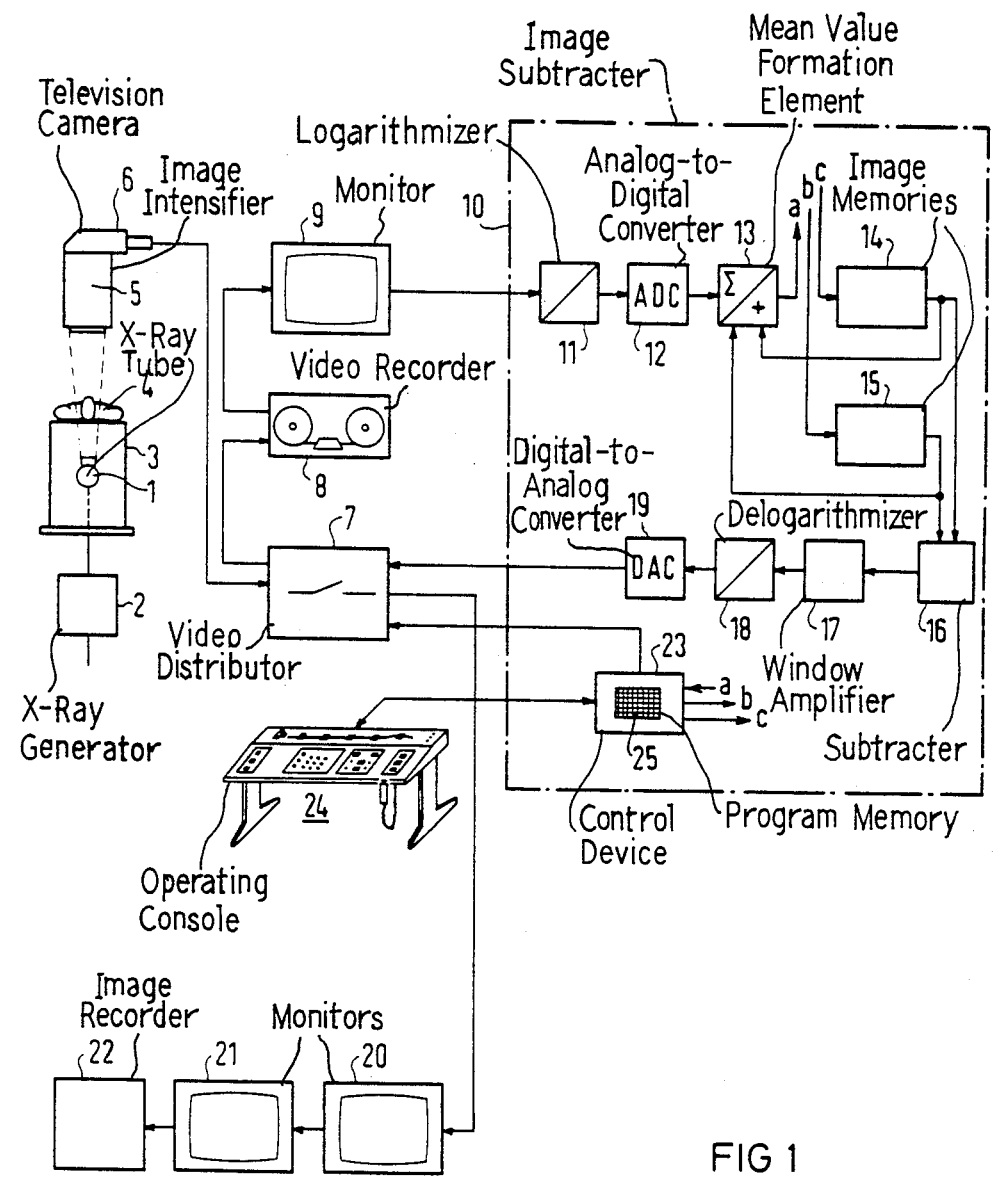
FIG. 1 is a schematic drawing of an X-ray diagnostic system constructed in accordance with the principles of the invention.

The X-ray diagnostic system illustrated in FIG. 1 has an X-ray source including an X-ray tube 1, which is fed by an X-ray generator 2 for irradiating a patient 4 lying on an X-ray table 3. An image intensifier television chain, including an X-ray image intensifier 5 and a video camera 6 receives the X-ray images and converts them into a video signal which is supplied to a video distributor 7. The video distributor 7 controls the recording of the X-ray images on a video recorder 8 and the display of these images on a monitor 9.

In the formation of difference or subtraction images, the video is supplied either in real time or delivered by the video recorder 8 to an image subtraction device 10. In the general organization of this image subtracter 10, at the input there is a logarithmizer 11, the output signal of which is passed to an analog-to-digital converter 12. The logarithmizer 11 causes signals to be subtracted from one another, the signals being proportional to the sum of the products of mass attenuation coefficient and mass of all substances which lie in the ray trace. In series with the output of the analog-to-digital converter 12, there is a mean value formation element 13 which performs a slided, weighted mean value formation for the purpose of signal-to-noise ratio improvement. The mean value formation element 13 may also perform a summation of image signals. The thus-obtained image signals are stored in two image memories 14 and 15, which are in turn connected to a subtracter 16 whose output signal, via a window amplifier 17, a delogarithmizer 18, and a digital-to-analog converter 19, is supplied to the video distributor 7, which effects the display of the subtraction images on monitors 20 and 21. With the aid of an image recording device, the subtraction images can be permanently retained, such as by photography.

As a first step in the production of angiographic subtraction images, the patient is irradiated subsequent to injection of a contrast medium into a blood vessel, but before the contrast medium has spread in the vessel region to be examined. A mask is placed in the image memory 14, which corresponds to the averaging or integration of several blank images. Subsequently, given a specific contrast medium concentration in the vessel region to be examined, an averaging or integration of several filling images is stored in the subtracter image memory 15. The contents of memory 14 is subtracted from the contents of memory 15 by the subtracter 16, and subtraction images are displayed on the monitors 20 and 21, which show only the vessels filled with contrast medium without the constant background. For overall control of the entire X-ray diagnostic system, a control device 23 is provided. The control device 23 includes a programmable memory 25 for selectively controlling the times of image storage in the image memories 14 and 15. The control device 23 is activated by an operating console 24.

Figure 2:
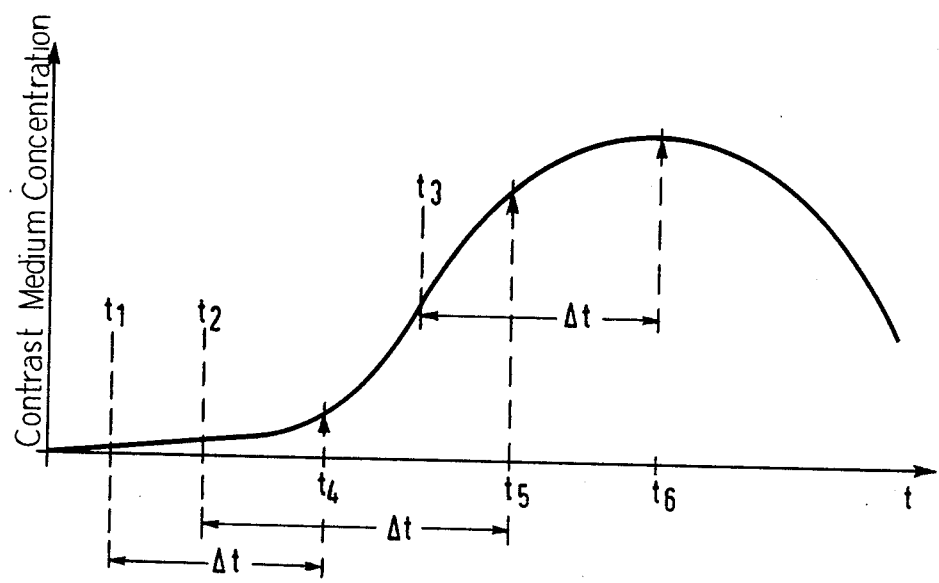
FIG. 2 is a graph representing the blood vessel X-ray contrast medium concentration over time and the programmed times of image storage.

The operating sequence of the X-ray diagnostic system is explained in more detail with reference to FIG. 2.

The graph shows an example of the chronological progression of the contrast medium concentration in a blood vessel. The contrast medium concentration increases slowly at first, then more rapidly, and finally drops off. The times indicated as $t_1$ and $t_4$, $t_2$ and $t_5$, and $t_3$ and $t_6$ correspond to image take pairs from which subtraction images are produced. The storage of masks in the image memory 14 occurs at times $t_1$, $t_2$, and $t_3$, whereas the storage of filling images occurs at the times $t_4$, $t_5$ and $t_6$. In this manner, a series of subtraction images may be observed on the monitors 20 and 21 which, to a degree, depicts the migration of the X-ray contrast medium during the succession of image takes.

Each of the storage times $t_1$ through $t_6$ may be preprogrammed by the user at the operating console 24.

The programmable feature of the invention also enables the user to program only times $t_1$, $t_2$, and $t_3$, and a time interval or time delay factor $\Delta t$ which corresponds to the duration between image storage time pairs $t_1$ and $t_4$, $t_2$ and $t_5$, and $t_3$ and $t_6$.

The control device 23 transmits the output signal of the mean value formation element 13 to the memories 14 and 15, at times corresponding to $t_1$ through $t_6$, as represented by connections a, b, and c.

The time interval $\Delta t$ between the storages of masks and filling images may be constant for all image pairs. Alternatively, the time interval $\Delta t$ may vary for each image pair. In any of the above-described program modes, the time parameters are preprogrammed by means of the operating console 24 with subsequent control of the image storage times by the control device 23 and program memory 25.

Although modifications and changes may be suggested by those skilled in the art, it is the intention of the inventor to embody within the patent warranted hereon all changes and modifications as reasonably and properly come within the scope of this contribution to the art.

I claim:

1. An X-ray diagnostic system for angiographic X-ray examinations comprising:
an X-ray source means;
an image intensifier television chain having an output supplying a succession of image data;
a patient support means disposed between said X-ray source means and said image intensifier television chain;
image subtraction device means, having first and second image memories for storing image data of images taken at different times, for producing images which are the result of a subtraction between image data in said first image memory and image data in said second image memory;
control device means operatively associated with said image subtraction device means having programmable memory means for selectively controlling the times at which image data are stored in said first and second image memories during an angiographic X-ray examination; and
display means for displaying said images which are the result of subtracting;
said programmable memory means being programmed with the times for storing images in said first image memory and with time delay factors for the times of storage in said second image memory relative to the time of storage in said first image memory.

2. The X-ray diagonstic system of claim 1, wherein said time delay factors are constant.

3. The X-ray diagnostic system of claim 1, wherein said time delay factors are variable.

* * * * *